United States Patent [19]
Lanier et al.

[11] Patent Number: 4,489,379
[45] Date of Patent: Dec. 18, 1984

[54] DISTRIBUTED DATA PROCESSING IN RING-STRUCTURED NETWORKS ARCHITECTED FOR FULL DUPLEX PEER-TO-PEER OPERATION OF PROCESSING STATIONS AND UNINTERRUPTIBLE TRANSFER OF LONG DATA RECORDS BETWEEN STATIONS

[75] Inventors: Charles S. Lanier, Delray Beach; Hiram M. Maxwell; Roger E. McKay, both of Boca Raton; Leonard Weiss, Hollywood, all of Fla.

[73] Assignee: International Business Machines Corporation, Armonk, N.Y.

[21] Appl. No.: 342,439

[22] Filed: Jan. 25, 1982

[51] Int. Cl.³ .............................................. G06F 3/04
[52] U.S. Cl. .............................. 364/200; 340/825.05; 370/86; 370/89
[58] Field of Search ... 364/200 MS File, 900 MS File; 370/86, 89; 340/825.05

[56] References Cited

U.S. PATENT DOCUMENTS

| | | | |
|---|---|---|---|
| 3,680,053 | 7/1972 | Cotton et al. | 370/86 X |
| 4,103,336 | 7/1978 | Gindi et al. | 364/900 |
| 4,136,384 | 1/1979 | Okada et al. | 364/200 |
| 4,205,326 | 5/1980 | Porter et al. | 370/86 X |
| 4,354,229 | 10/1982 | Davis et al. | 364/200 |
| 4,368,512 | 1/1983 | Kyu et al. | 364/200 |

Primary Examiner—Raulfe B. Zache
Assistant Examiner—David L. Clark
Attorney, Agent, or Firm—R. Lieber

[57] ABSTRACT

In a ring-structured data communication network, in which plural data processing systems exchange data and control information on a full duplex peer to peer basis, systems are presently architected to assign at least three I/O subchannels (i.e. at least three device addresses) to respective ring interface adapters. At least two of these subchannels are dedicated for providing separate input paths from the ring to at least two associated program-assignable areas in their system's main store, and a third of these subchannels is dedicated as an output path from the system's store to the ring. Collectively, these subchannels can sustain two input transfer processes and one output transfer process concurrently. One of these input processes is associatable with a locked mode of adapter operations which provides a non-blockable path for data transfer from a selected (remote) station on the ring to the respective system's main store. In this mode the other input subchannel and the output subchannel permit the system to maintain full duplex communication with other ring stations in respect to network transactions/processes which may require priority attention. Information is sent on the ring in discrete information frames of variable bit length, each frame acknowledged by a response frame. In general, response frames have much shorter bit lengths than the information frames, enabling the systems to access the ring more efficiently than they would be able to if response and information frames had equal lengths.

8 Claims, 9 Drawing Figures

\* — IF MORE THAN ONE FRAME IS BEING SENT, THE OUT BUFFER IS CLEARED WITH EACH POSITIVE ACKNOWLEDGEMENT (FROM D) & SIGNAL IS GIVEN TO THE CHANNEL TO "RELOAD" THE BUFFER

DISTRIBUTED DATA PROCESSING IN RING-STRUCTURED NETWORKS ARCHITECTED FOR FULL DUPLEX PEER-TO-PEER OPERATION OF PROCESSING STATIONS AND UNINTERRUPTIBLE TRANSFER OF LONG DATA RECORDS BETWEEN STATIONS

BACKGROUND OF THE INVENTION

This invention relates to methods of conducting data communications in ring-structured distributed processing networks. In particular the invention concerns a method of operating processing station systems in such networks in a locked receiving mode whereby a selected ring station may be given virtually continuous and exclusive access to the (locked) receiving station's system for transferring a variable amount of data into a program-assignable area of that system's main store.

A problem in respect to such operations is that a locked receiving station could be isolated from ring stations other than the selected station for intervals of time which are unacceptably long, "unacceptably" in the sense that the benefits derived from locked mode operation may be effectively cancelled by the network disruption caused by the isolation of the locked station from other stations requiring immediate controlling attention.

The object of the present invention is to provide a method of operating such ring station systems in the locked mode which allows the locked system to remain effectively accessible to all ring stations.

SUMMARY OF THE INVENTION

In accordance with the present invention, data processing systems operating in such ring networks are architected to assign at least three I/O subchannels (i.e. at least three different device addresses) to respective ring interfacing equipment termed ("adapters"). At least two of these subchannels are dedicated as input paths from the ring to associated program-assignable (i.e. variable) areas in the respective system's main store and a third of these subchannels is dedicated as an output path from that store to the ring.

These subchannels may be "armed" (i.e. readied by system programs to conduct respective input and output information transfer operations) independent of each other (i.e. asynchronously) so that while a station is operating in a locked receiving mode through one of these input subchannels the other input subchannel and the output subchannel effectively provide the respective system with full duplex access to the ring for exchanging urgent priority communications with other ring stations.

In the present system data and control or attention request messages are respectively sent out on the ring in discrete data frames and request frames of limited bit length which are individually acknowledged by response frames returned to the data/request originator from the data/request destination station. Data and request frames contain at least 7 bytes and not more than 1,007 bytes (1 byte = 8 bits), whereas each response frame invariably contains only 7 bytes. Due to the generally shorter lengths of the response frames the ring is effectively more accessible for transmission access than it would be if all frames had equal durations.

In accordance with the invention a station ring adapter is placed in the locked reception mode by one of two methods. In one method the adapter is conditioned to the locked mode by programmed commands performed by the respective system processor and channel. In this mode the adapter stores the identity of a selected origin station to which it is being locked (a function accompanying the command signals) before any data has been sent by the origin station. In a second method the station adapter reacts to control information contained in a first frame of a plural-frame data message and enters the locked mode. The control information indicates additional frames will follow. The adapter stores the identity of the sending station (also contained in the first frame) and begins locked mode operation while the first frame is being received.

With either method, the subsequent station/network operation is the same. The adapter accepts data frames directed to its station address (destination) from the locked origin station and refuses similarly directed data frames from other ring stations. Accepted data frames are passed through one of the dedicated input subchannels to a main storage space prepared for that subchannel (by system programs) and an acknowledgment response frame is returned to the locked origin station permitting it to transmit another data frame. Refused data frames are discarded by the adapter and a "frame refused" response frame is sent to the origin station indicating in effect that the destination station was not prepared for reception of such data frames.

Incoming request frames are accepted by the locked adapter, passed through the other dedicated input subchannel to a main storage space prepared for that subchannel, and an acknowledging response frame is returned to the request/control source station. The information in the stored request frame can be processed by the station system, and that system can send associated data or control to any station through the dedicated output subchannel and the ring (in a data or request frame) while receiving data in the locked mode.

Accordingly, in locked mode plural frames of data sent by one station are exclusively received and stored by the destination station (without the potential disorder which would result if data from several stations could be passed to one subchannel's storage space) and if the locked data transfer occupies many frames it cannot block reception and processing of important request frames.

For a more complete understanding of the invention, as well as a comprehension of other advantages and features thereof, reference should be made to the following description taken in connection with the accompanying drawings, and to the appended claims which indicate the scope of the invention.

DETAILED DESCRIPTION

Figure 1:
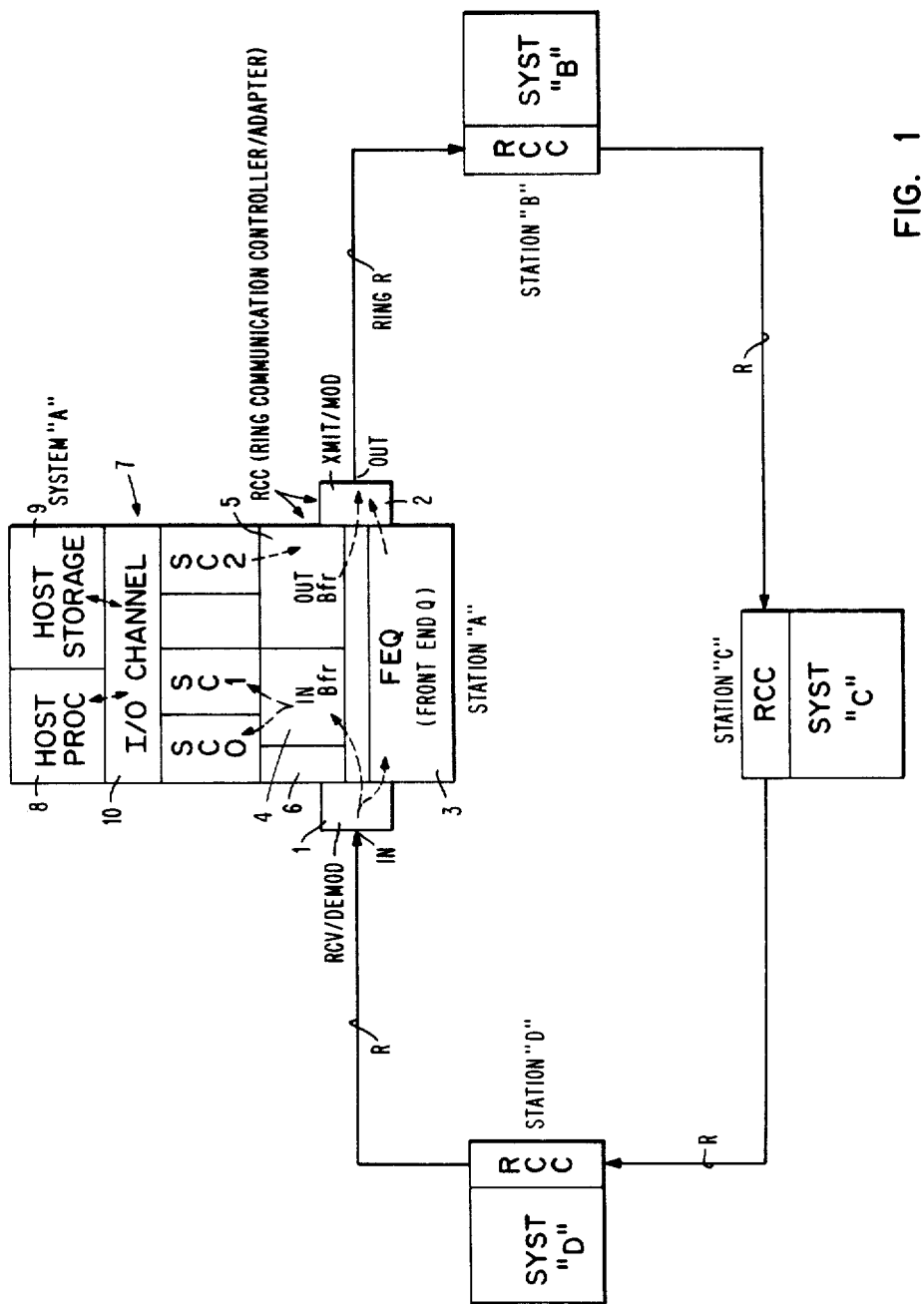
FIG. 1 schematically illustrates a ring network configurable for sustaining peer-to-peer data communications in a full duplex uninterruptable (locked) mode, in accordance with the present invention.

FIG. 1 illustrates a ring network structured for enabling multiple data processing stations to conduct full duplex communications as peers (i.e. without a central node or master station). Each station contains ring adapting equipment RCC standing for (Ring Communications Controller) and a host data processing system. Each RCC interfaces between the ring medium R and the respective host system.

For the sake of simplicity, only four stations (A, B, C and D) are illustrated. It will be understood, of course, that a much larger number of stations could be accommodated.

The stations transmit information on the ring R in discrete frames having predetermined header formats and variable but limited bit lengths. A single data record may occupy multiple frames. The frames circulate unidirectionally on the ring—clockwise in the illustration of FIG. 1—with origin address, destination address and type specifier information enabling destination stations to receive and selectively process the information.

Figure 2:
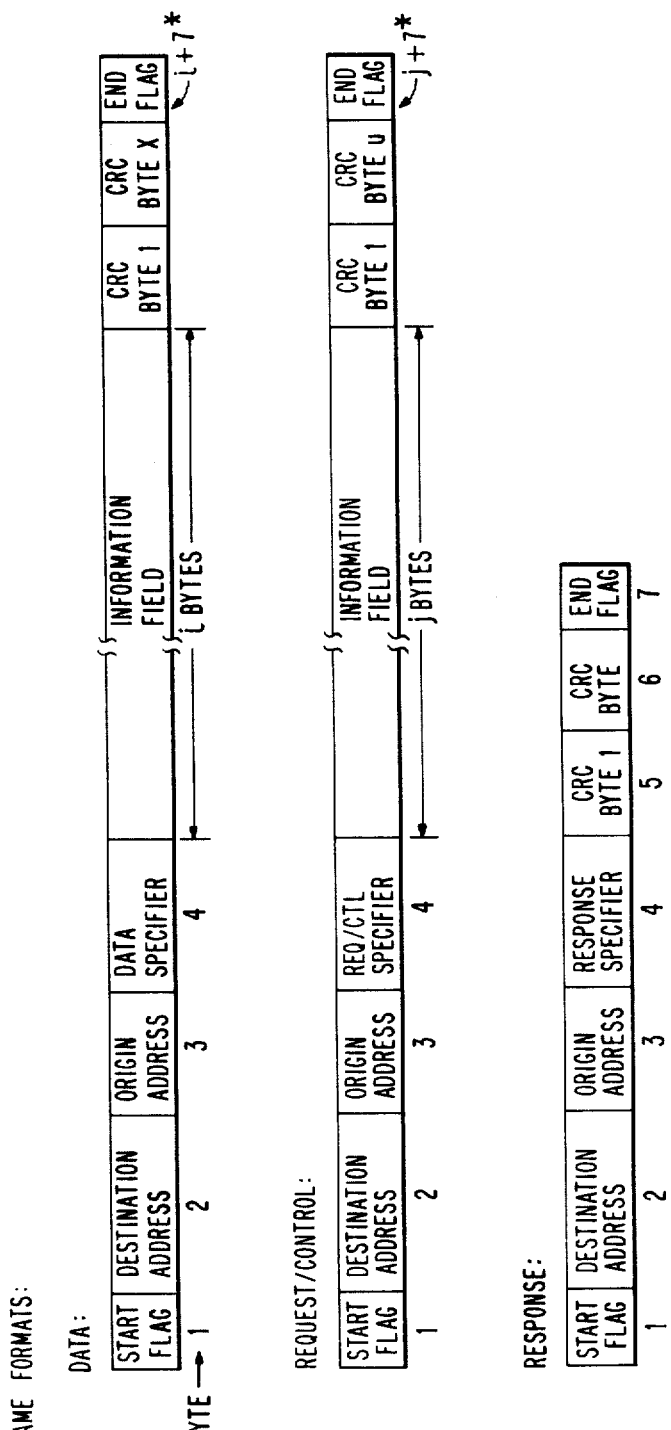
FIG. 2 illustrates various frame formats employed in the ring structure of FIG. 1.

The three presently pertinent types of frame formats, shown in FIG. 2, are "data", "request" and "response". Data type frames contain data information, request type frames contain attention request or other control information, and response type frames contain information signifying acceptance, refusal or incomplete receipt (due to error) of specific data and request frames. Each data and request frame must be discretely acknowledged, refused or signified as incompletely received by a response frame from the destination station, before the origin station can send another data or request frame (or retransmit an incorrectly received frame) to that destination.

As shown in FIG. 2, data and request type frames have variable byte (bit) lengths—in the present embodiment not more than 1,007 bytes (8,056 bits) and not less than 7 bytes—whereas response frames have fixed lengths of exactly 7 bytes. Each frame contains a four byte header part and a three byte end part. The header consists of a "start flag" byte, "origin" and "destination" address bytes, and a "specifier" byte. The end part consists of two cyclic redundancy check bytes (CRC) and an "end flag" byte.

The CRC bytes are used for error detection/correction purposes not relevant to the present invention. The start and end flag bytes respectively indicate the beginning and end of the frame. The address bytes indicate addresses of the origin station which sent the frame and the destination station (or stations) to which the frame is being sent. The specifier byte specifies the frame type (data, request, response) and certain other control information discussed later.

The origin and destination of each response frame invariably correspond to the destination and origin of one and only one previously transmitted data or request frame (since, as noted previously, each data and request frame must be discretely "acknowledged" by a response frame before another frame can be sent between the same origin and destination station pair).

FIG. 1 shows a station organization at A representative of the organizations of all ring stations (A-D). Each station contains ring adapter equipment 1-6 and a host processing system 7. The ring adapter contains receiving circuits 1, transmitting circuits 2, an FEQ (front end queue) buffer 3 for storing ring traffic in transit through the station to downstream destination stations, "in" and "out" buffers 4 and 5 for respectively storing incoming ring traffic (for inspection and internal routing) and outgoing local origin information and response frames, and inspection control logic 6 for examining local destination information stored in the "in" buffer and determining its handling. Each host system 7 contains a (central) processor 8, a (main) store 9 and an I/O channel 10 capable of sustaining multiple subchannel transfer processes concurrently (relative to the ring and other "peripherals").

Logic 6 examines incoming frame headers, routes frames having local destinations to the in buffer, checks (and, if possible, corrects) frames having local destinations, and routes frames having remote destinations to the transmitter 2 via the FEQ. In respect to data and request frames having local destinations, a response frame is prepared and directly passed to the ring (via Out Buffer 4 and transmission equipment 2). The response frame distinguishes correct or incorrect reception of the respective data or request frame, and acceptance or refusal of the frame (refusal if an input subchannel is not presently available for transferring the frame information into host main storage).

In general, information contained in incoming data or request frames having a local destination is staged in the station in buffer 4 and then conditionally transferred through an input subchannel to host storage 9. Such stored information is thereafter duly processed by the station processor 8. Since a single data message or record may occupy multiple data frames (each separately sent and acknowledged), processing of the data contained in such messages is generally not initiated until after the last frame has been received and stored.

The in buffer, out buffer and "through-traffic" FEQ buffer 3 are each designed to hold at least a maximal length data frame including header (i.e. at least 1,007 bytes). The FEQ is organized for first-in first-out (FIFO) operation and each buffer may be implemented by means of a RAM (random access memory) storage array. As is usual for FIFO systems the FEQ requires in counting and out counting facilities for tracking locations at which information is to be respectively entered next and removed next.

Station bit transmissions are timed with reference to internal clock sources and station bit receptions are timed with reference to clock functions derived from incoming traffic (i.e. with reference to transmission clocks of preceding upstream stations). The station transmission clocks nominally have identical frequencies but need not be in phase synchronism. Accordingly, the station clocks may drift relative to each other (over many frame transmission periods), requiring certain adaptation procedures. These procedures are not presently relevant, but they are described briefly below to illustrate an operating ring environment in which the invention may be advantageously used.

When a station's FEQ is not empty the contents of its FEQ are passed directly to its output 2 in a FIFO sequence. When the FEQ is empty the station either transmits frames containing local origin data, control or response information, if such information is available for transmission, or it transmits idle characters which are readily distinguishable from frame characters (not being bounded by start and end flag bytes). In order to allow for timing differences between incoming and outgoing traffic the occupancy tag of a station's FEQ is set from empty to not empty only when the FEQ contains at least four bytes and it is reset from not empty to empty only when the FEQ contains no bytes (in count=out count). Consequently, while a frame is being passed through the FEQ to a station's transmitter there cannot be a "short fall" condition (buffer empty before transmittal of the end flag of a frame partly transmitted) since at least four bytes of the frame must have been in the FEQ before the transmission began and the timing of a frame is short by comparison to the interval over which the transmission clock could drift by the equivalent of four byte periods.

When a station is receiving idle characters from the ring it uses such characters to maintain reception synchronism but does not enter them in its FEQ and does not advance its entry position address count for the FEQ. Consequently, if the FEQ becomes or is empty and idle characters are being received the station is permitted to send its local origin information while it is receiving the idle characters. This element of idle time usage, coupled with the present employment of relatively short response frames, gives the stations on the ring earlier transmission access to the ring than they would otherwise have and is considered a feature of the present invention.

The fourth/specifier byte of the response type frame (see FIG. 2) may indicate several different types of responses: a positive acknowledgment response indicating successful reception, a negative acknowledgment response indicating error in the received frame or a refusal response indicating rejection of the associated frame because the receiving system presently does not have an input subchannel available for transferring the frame information to its host storage (this might indicate a procedural error in preceding control frame communications in certain circumstances).

Another aspect of the present invention concerns the logical organizations of processor 7 and adapter controls 6 for handling data received in "locked" mode. In accordance with the invention a station receiving a data message more than one frame long may be conditioned to operate in a "locked" mode in which an input subchannel of the station's host system is dedicated exclusively for transferring that data message (into a program-prepared space in the receiving station's host storage), and (local-destination) data frames received from other than the selected station are rejected with a frame refused response. This mode of operation can be instigated either by the station's processor and I/O channel, under program control, or while receiving the first frame of a plural-frame data message in response to control information in the specifier byte of the first frame indicating that other data frames will follow from the same station (usually as part of one continuous message unit).

Furthermore, each host processing system in accordance with this invention is architected to dedicate at least two of its input subchannels and at least one output subchannel for separately conducting communications between its main store and the ring. In other words, each station system is architected to assign at least three device addresses to its ring communication adapter, at least two of these addresses exclusively for conducting input transfers from the ring to its host store and one address for conducting only output transfers to the ring.

This architectured dedication feature guarantees availability of full duplex linking facilities between the station and the ring for conducting control communications (receiving request frames from the ring and sending request or data frames out on the ring) while one of the dedicated input subchannels is operating in the foregoing locked mode relative to receiving a plural-frame data message. It thereby guarantees that time-critical action required between two or more stations in the network cannot be blocked indefinitely by a locked mode data receiving operation in one of these stations.

Figure 3:
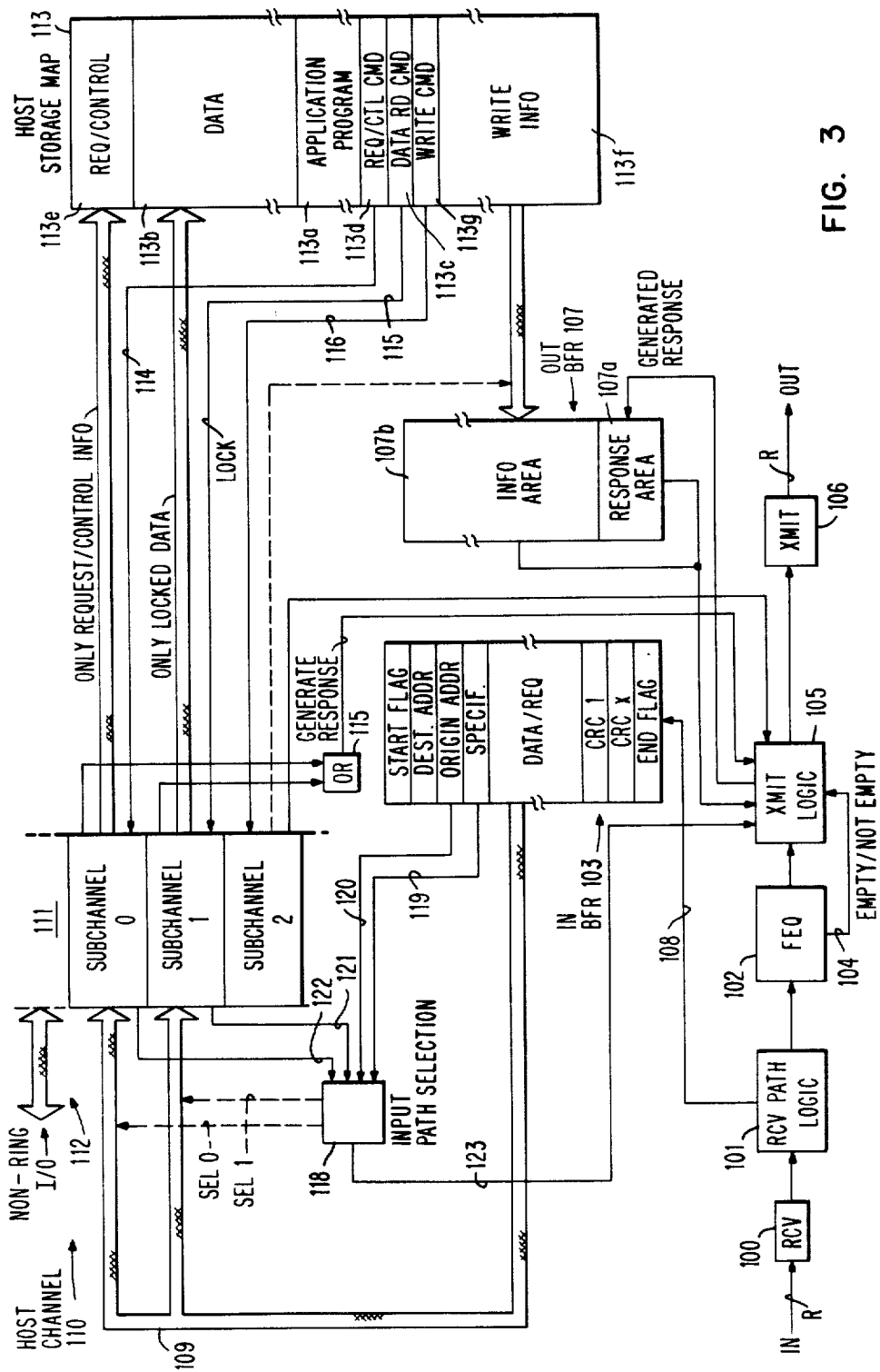
FIG. 3 illustrates logical details of ring adapting equipment, embodying the operational method of this invention, for interfacing between a station processor and the ring.

FIG. 3 illustrates the logical organization of a subject station system for operating in this locked data receiving mode. The logical configuration of the station when not operating in the locked mode will be explained with reference to this Figure and FIGS. 4 and 5. Station system procedures for entering (and leaving) the locked mode will be explained with reference to this Figure and FIGS. 4, 6 and 8.

Referring to FIG. 3, incoming ring frames are passed through receiver 100 and path selector 101. Receiver 100 demodulates the received signal, extracts bit timing reference clocking from the demodulated signals, and passes the demodulated bits to selector 101. Selector 101 distinguishes idle characters from frame characters (recall that frames follow a start flag byte contiguously, as shown in FIG. 2, whereas idle characters will contiguously trail end flag bytes), discards bytes which represent idle characters, distinguishes frames having a local destination from other frames, passes other frames to the FEQ buffer 102, and enters local-destination frames into the In Buffer 103. Frames having a "broadcast address" destination are steered into both the FEQ and the In Buffer (such frames, which are usually request type frames intended for a group of stations or all stations, circulate through all stations and are removed from the ring at the origin station when they return to that station via the ring). Selector 101 includes a not-shown delay for holding the first three bytes of the incoming frame header until the routing decision is made.

The FEQ contains a not-shown random access storage array (RAM) and a not-shown pair of "in" and "out" counters for respectively indicating next addresses in the RAM at which incoming bytes are to be entered and removed. When the FEQ becomes empty (in count=out count) an empty condition is manifested on line 104. When this condition is manifested and the FEQ acquires four bytes (in count−out count=4) the indication on line 104 is changed to manifest a not empty condition. This delay in manifesting the not empty condition is used to ensure that transmission of information from the FEQ to the station's output ring port will not begin prematurely and thereby potentially create an overrun condition because of timing differences between the station's separate transmission and reception clocks (the former derived from the received signals and the latter generated separately from an internal crystal oscillator).

Transmission source selector 105 reacts to manifestations on line 104 and other control indications noted below to select information for application to the station's transmitter 106 from either the FEQ or the station's Out Buffer 107. When the FEQ is empty and the Out Buffer contains either a complete response frame in its response area 107a or a complete locally originated data or request frame in its local staging area 107b, a frame is transferred from the Out Buffer to transmitter 106 (if areas 107a and 107b are simultaneously full the contents of 107a are transferred first). If the FEQ is not empty, and a frame is not currently being transferred from the Out Buffer to the transmitter, the FEQ is unloaded to the transmitter on a FIFO basis. If the FEQ is empty and the Out Buffer does not contain a complete frame the selector 105 causes idle characters to be sent by the transmitter. When such idle characters are received at the next station on the ring they are discarded by its input selector 101.

Receiver input selector 101 applies (local-destination) data and request frames to In Buffer 103 via bus 108. Incoming (local-destination) response frames are used to operate not-shown indicators for directly signalling to the host system channel the status of completion or non-completion of any previously sent local-origin data or request communications. Frames are transferred conditionally from the In Buffer to output bus 109, and from that bus to the host system's I/O channel 110, depending on the availability of a suitably prepared input subchannel as described next.

Channel 110 contains plural subchannels 111. As explained previously, at least two of these subchannels (only two in the presently disclosed embodiment) are dedicated exclusively as input subchannels for conducting input transfers from the ring R to host storage (via the In Buffer), and another one of these subchannels is dedicated as an output subchannel only for conducting output transfers from host storage to the ring (via the Out Buffer). The dedicated subchannels are designated herein as subchannels 0, 1 and 2 (abbreviated SC0, SC1, and SC2). SC0 and SC1 are dedicated as input subchannels and SC2 is the dedicated output subchannel. Furthermore, in the presently disclosed embodiment of this invention, SC0 is dedicated exclusively for inputting information contained in request frames and SC1 is dedicated exclusively for inputting information contained in data frames. Other subchannels 111 are used for sustaining communications between the host system and its "peripherals" via a bus indicated generally at 112.

The dedicated input subchannels are prepared for conducting respective input information transfers as follows. With reference to the host main storage map indicated at 113, when SC1 is available and required (for an input data transfer) application programs at 113a allocate a space 113b for data storage and prepare a command at 113c for "arming" SC0. When this command is performed (by channel 110) SC1 is "armed" (readied for immediately transferring data from In Buffer 103 to space 113b). Similarly, when SC0 is available and needed, host application programs prepare a Read Request/Control Information command at 113d which when performed "arms" SC0 for transferring information contained in a request frame from the In Buffer to a prepared area 113e in host storage.

For output transfers, host programs load the outgoing information into a selected area 113f and schedule a Write (output) command shown at 113g for execution when SC2 is accessible. The write command arms SC2 for conducting an output transfer of one or more frame-loads of information between the area 113f and the Out Buffer (one frame-load at a time, and each frame-load after the first conditional on prior receipt of a positive acknowledgment response from the destination station).

Lines 114-116 represent control signalling paths for respectively arming SC0, SC1 and SC2. SC0 and SC2 are armed simply by applying signals to these subchannels for transferring them from "unprepared" to "prepared" states. In their prepared states SC0 and SC2 are readied respectively for immediately inputting request information and outputting outgoing information. SC1 is also armed in this manner, but in addition, SC1 may be armed for operation in either an unlocked or locked mode and receives a conditioning signal establishing one of these modes. Furthermore, when operating in the locked mode SC1 receives a station address representing its exclusive origin for input data. In the locked operation input data from any other source is refused.

Internal path selector 118 determines whether information contained in local destination incoming frames (in the In Buffer) should be refused or passed (to host storage via SC0 or SC1). The selector also selects a suitable response ("positive error-free acknowledgment", "negative error-associated acknowledgment" or "frame refused") and applies an appropriate signal to transmission path selector 105 causing the latter circuit to generate a corresponding response frame which it transfers to Out Buffer area 107a for transmittal via the ring to the incoming frame's origin station. Signals received via lines 119-122, and stored by the selector, determine its action.

The action of selector 118 is conditioned on the incoming frame type (data or request), the preparational state (prepared or unprepared) of the associated subchannel (SC0 for request, SC1 for data), and in respect to data frames, the locked or unlocked status of SC1. If a request type frame is received and SC0 is prepared the frame is passed to SC0. If SC0 is not prepared, the frame is rejected (discarded) and a frame refused response is returned to the origin station. If SC0 is prepared and receives the frame without error, the frame is stored in program-prepared area 113e (of host main storage) and a positive acknowledgment response is returned to the frame's origin station (via selector 105, the Out Buffer, transmitter 106 and the ring). If the frame contains an uncorrectable error an error indication is stored in SC0 and a negative acknowledgment response is returned to the origin station.

If the frame is a data type frame and SC1 is prepared and unlocked the frame is simply passed through SC1 to program-prepared storage space 113b and a positive or negative acknowledgment response is returned to the sender station depending respectively on whether this operation is completed without or with error. In the same circumstance if SC1 is not prepared the frame is rejected and a frame refused response is returned to the sender. If SC1 is both prepared and locked the action of selector 118 depends on the frame's origin, as represented by the third byte (origin byte) in its header. Selector 118 receives this address via line 120 and compares it to the origin address which it received from line 121 during the preparation of SC1 (and then stored). If the compared addresses match, the frame is accepted and the data is passed to SC1. A positive or negative acknowledgment response is returned to the sender depending on the state of completion of the transfer (without or with error), and if the transfer is successful the data is stored at 113b. If the compared addresses do not match the frame is rejected and the frame refused response is returned.

In respect to the foregoing transfer of data when SC1 is prepared and unlocked, selector 118 conditionally may establish a locked mode of operation during this type of transfer. Selector 118 receives specifier byte information, via line 119, indicating whether more data frames will follow from this frame's origin (usually, as part of one continuous data message or set and in association with one subchannel preparational command). If more data will not follow (i.e. this is the only data frame being communicated) the frame is simply passed to SC1 as above. However, if the specifier byte indicates more frames to follow, selector 118 stores the frame's origin address (received via line 120) and conditions itself and SC1 for locked mode operation as described above.

The foregoing operations are summarized in the following table.

received at a station not having its SC0 prepared it is merely "repeated" via the station's FEQ. Since such frames are not acknowledged it is incumbent on any station having a message to send in this broadcast mode to send the message several times in order to ensure its reception at all intended stations.

The above table also indicates a "bypassed" mode of station operation not presently relevant but deserving brief mention. In bypassed mode the station's receiver output is coupled directly to the station's transmitter input bypassing the station's selectors, FEQ and internal

| HANDLING OF RECEIVED FRAMES HAVING LOCAL DESTINATION | | | | |
|---|---|---|---|---|
| STATION | SUBCHANNEL STATE | | FRAME | |
| MODE | SC0 | SC1 | TYPE | ACTION TAKEN |
| Unlocked | x (don't care) | Prepared | Data | Frame data passed to SC1; if other frames to follow (specifier byte indicates this) station set in locked mode relative to origin of this frame & origin station's identity is stored by ring adapter for selection of subsequent frames; if passage to SC1 storage is completed without error a positive ack. response is sent; if error encountered a negative ack. response is returned. |
| Unlocked | x | Unprepared | Data | Frame suppressed and "frame refused" response is returned to sender. |
| Unlocked | Prepared | x | Ctl/Req | Frame information passed to SC0 storage and if no error positive ack. response is returned (or neg. ack. if error) |
| Unlocked | Unprepared | x | Ctl/Req | Frame suppressed; "frame refused" response returned to sender. |
| Locked (to S) | x | Prepared | Data (from S) | Data transferred to SC1; (pos/neg ack) response returned to sender (no error/error). |
| Locked (to S) | x | Prepared | Data (from Y) | Data suppressed; frame refused response returned to sender (Y) |
| Locked | Prepared | x | Ctl/Req | Data passed to SC0 storage; pos ack or neg ack response returned (positive if no error; neg if error) |
| Locked | Unprepared | x | Ctl/Req | Frame suppressed; frame refused response returned to sender |
| Bypassed | x | x | x | Frame returned to sender (via FEQ & R); sender removes frame from ring |
| x | Prepared | x | Broadcast Request | Frame received via SC0 & passed on via FEQ; frame removed from ring by sender after completing one lap |
| x | Unprepared | x | Broadcast Request | Frame ignored at this station, but passed on via FEQ and removed by sender after one lap. |

In order to generate the response frame selector 105 takes the origin address byte of the incoming frame's header and positions it as the destination byte of the response frame. It also takes stored constants representing the local station address, start flag and end flag functions, and inserts these into appropriate response frame positions. It generates a specifier byte as a function of the response type (positive ack, negative ack or frame refused) and appropriately positions that byte in the response frame. Finally, it generates CRC bytes as a function of other bytes in the frame. The Out Buffer, as previously mentioned is a RAM array having areas 107a and 107b respectively dedicated for response storage and outgoing local-origin message storage. The response frame bytes are entered into appropriate positions in area 107a as they are generated, and when the complete response frame has been stored a signal is given to transmitter 106 indicating its availability for transmission.

The foregoing table indicates a broadcast frame type not previously mentioned, and not particularly relevant to this invention. The broadcast frame is a request type frame intended for reception at more than one station, either a particular group of stations or all stations on the ring. When such a frame is received and SC0 is prepared the frame is passed to SC0 but no response is generated. The frame is also steered into the FEQ by selector 101 while it is being placed in the In Buffer. Accordingly, the frame will circulate through the FEQ to the ring output and pass downstream to the other stations on the ring. When the frame returns to its origin the selector 101 at that station will recognize its origin and remove it from the ring (suppress it). If the frame is paths. This mode permits the station's internal logic to be isolated from the ring for error recovery purposes. As noted in the table, in this mode all frames directly bypass the station, whereby any frame intended for local reception will return to the origin station with the same form as when it was transmitted and without a response. In this case the selector 101 at the origin station recognizes the occurrence, removes the frame from the ring (suppresses it), and may also pass a signal to its host system for alerting host programs to the occurrence as an indication of an altered ring configuration.

Figure 4:
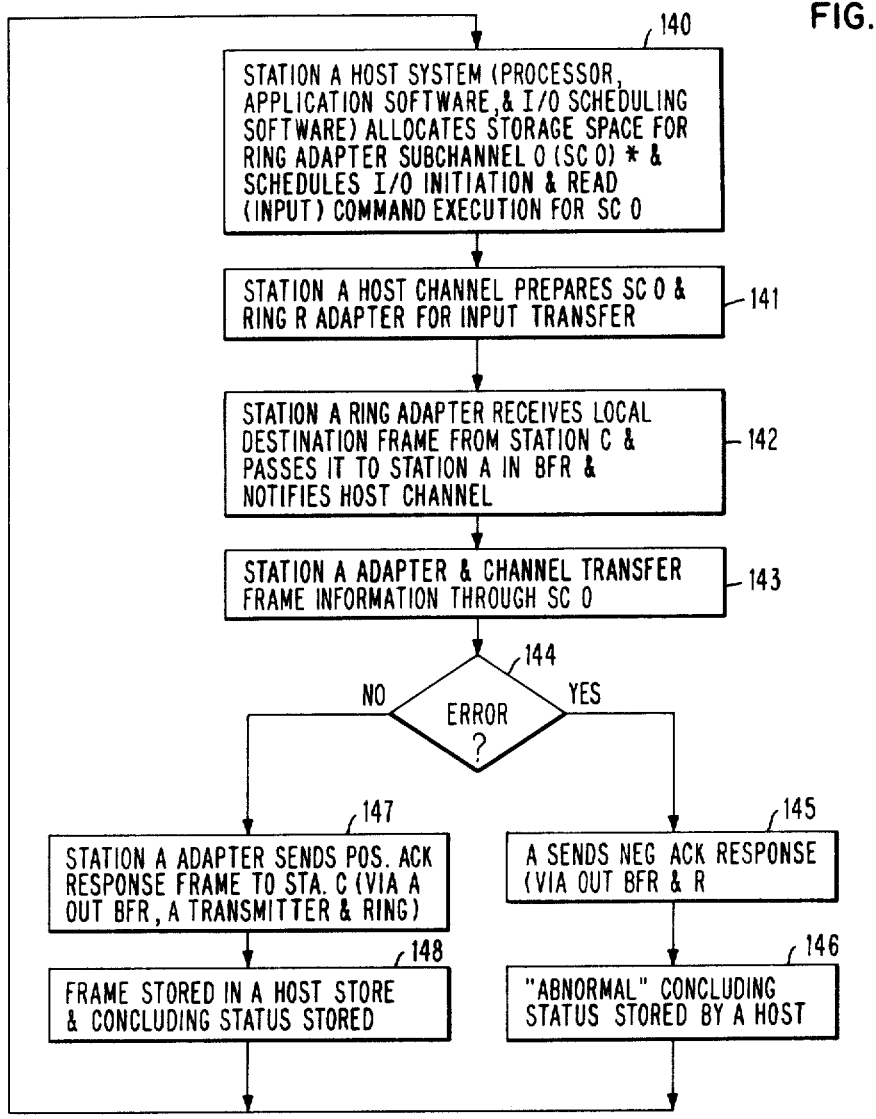
FIGS. 4–7 illustrate station/network processes for conducting communications between stations on a ring, in locked and unlocked modes, in accordance with the present invention.

The flow diagram of FIG. 4 provides an overview of how stations prepare for receiving locally-directed request messages and how they handle such messages through their SC0 subchannels. Block 140 indicates operations of host system programs in respect to preparation of SC0. The host's application and scheduler software prepare (reserve) suitable storage space (i.e. 113e, FIG. 3) and schedule the execution of an I/O initiating instruction. Block 141 indicates that this instruction activates the channel to set up a read (input) transfer operation, in "ring-dedicated" subchannel SC0, which places SC0 in a prepared ("armed") condition. Blocks 142 and 143 indicate that with SC0 armed a request type frame sent by any ring station (station C in this example) and having a local destination, will be accepted on receipt and "immediately" passed to SC0 for input handling. Decision 144 and blocks 145 and 146 indicate that if the resulting input transfer is accompanied by an error a negative acknowledgment response will be returned to the sender and the channel operation will conclude with a report of error status to the host software (i.e. via an I/O interruption). Decision 144 and blocks 147 and 148 indicate that if the input transfer is error-free a positive acknowledgment response is returned, the frame information (attention request or control message) is stored in host storage and the operation is concluded with a report of successful status to host software.

With either successful or unsuccessful conclusion SC0 is placed in the unprepared (disarmed) condition. If a local-destination request frame arrives while SC0 is disarmed the frame is rejected with a frame refused response. Accordingly, if the host system software is supposed to minimize such refusals (in order to conserve ring bandwidth) the software should be designed to rearm SC0 quickly (as soon as possible after receiving the concluding status). Of course, this aspect of software operation is not relevant to the present invention.

Figure 5:
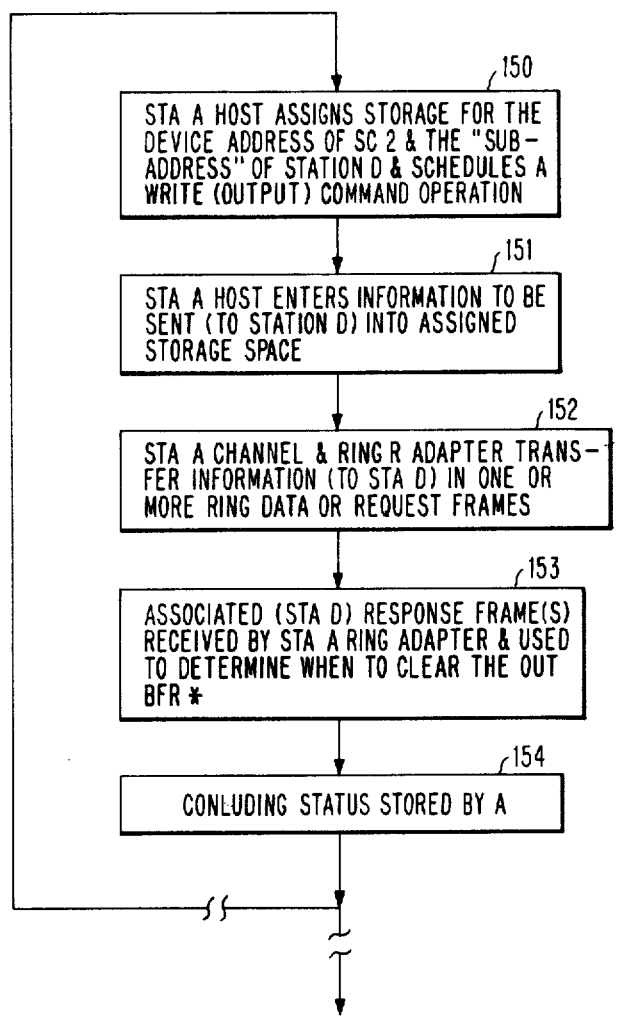

FIG. 5 indicates how stations conduct their output transmissions, in an example describing transmission of a message from ring station A to ring station D. Blocks 150 and 151 indicate that host software prepares outgoing message information (attention request, control information or data) in a suitable space in host storage and associate the message with the device address of SC2 and with the "sub-address" of ring station D. Blocks 152 and 153 indicate that the station A channel forwards the information to the ring adapter which passes it to station D. If the information occupies more than one frame it is passed one frameload at a time. The channel arms SC2, passes a frameload of information through SC2 to area 107b in the Out Buffer (FIG. 3) and waits for a response to return via its ring adapter before either concluding the operation (block 154) or passing another frameload of information to the adapter.

In the present embodiment only data messages may occupy more than one frame. When passing the first frame of a plural-frame data message to the ring adapter the channel provides an indication to SC2 and the adapter that at least one more additional frame will be sent in this operation. SC2 then conditions the adapter to prepare a specifier byte for the first frame indicating that it is both a data frame and not the last frame of the associated data message. As mentioned previously, if SC1 at the receiving station is armed and unlocked this information is used to set up a locked mode of reception while the first frame is being received. When the last frame is sent SC2 and the adapter are conditioned to provide a last frame indication in the outgoing specifier byte, enabling the receiving station to pass a corresponding indication to its host system and thereby permitting the receiving system to bring its corresponding read/input operation to an early conclusion.

Figure 6:
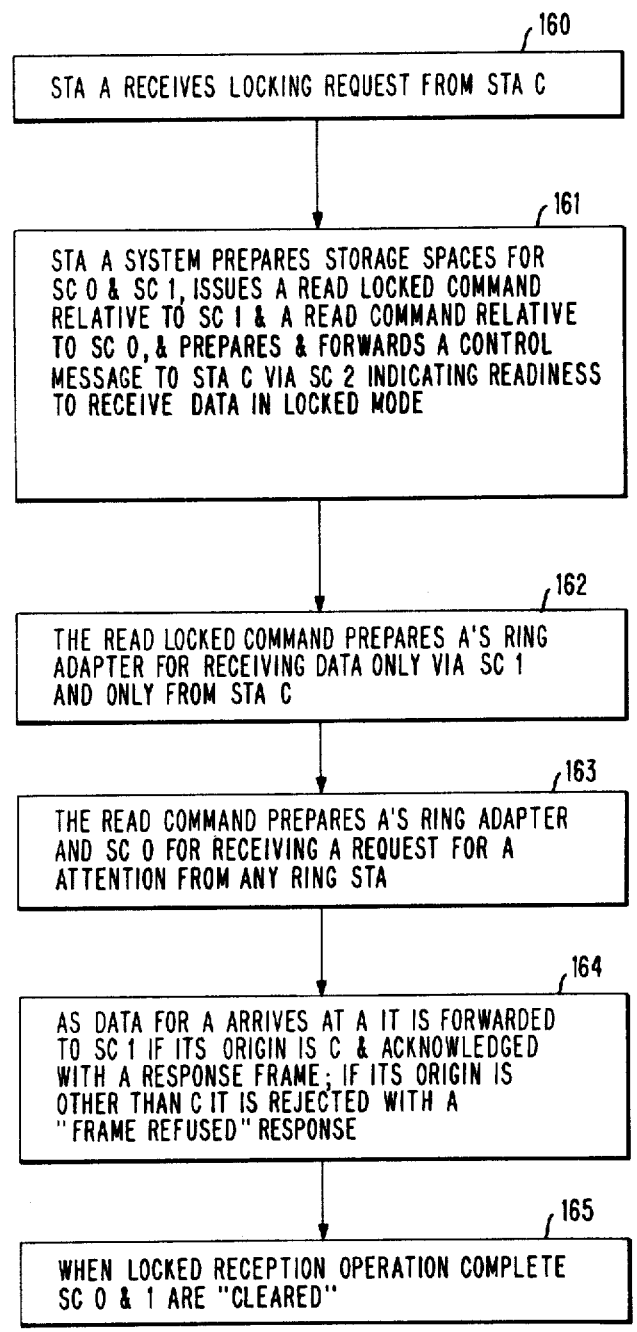

FIG. 6 shows the process at a typical station (station A) for setting up a locked mode of "plural-frame" data reception operation relative to another station (station C) before that station sends any data frames. Another method for entering the locked mode, while receiving the first frame of a plural-frame data message in unlocked mode, will be discussed later with reference to FIG. 7. In this process station A receives a locking request frame directed from station C to station A (block 160), and application software in station A's host system prepares host storage spaces for subchannels SC0 and SC1 (block 161). The space prepared for SC0 is sufficient to receive at least one request frame from any station on the ring, and the space prepared for SC1 may be sufficient to receive the data occupying a number of data frames specified in C's request.

Station A's software then issues an initiating instruction and a Read Lock command relative to SC1, and a separate initiating instruction and a Read command relative to SC0 (blocks 162 and 163). The Read Lock command prepares SC1 to receive (local destination) data contents of data frames from A's ring adapter only if sent from station C and to refuse data frames sent to A from any other station (block 164). The Read command prepares SC0 to receive the request or control information in one request frame sent to A from any station.

Accordingly, any request frame arriving at A during the reception and response process associated with C's data will be passed to A host storage and processed. If A must send information to another station while receiving C's data (e.g. if A must respond to a request) A's software will prepare the information in storage, arm SC2 and send the information in one or more data or request frames. When the locked reception process is complete/concluded SC1 is disarmed. SC0 may be disarmed before or after this conclusion, depending upon the time of arrival of a request to A.

Figure 7:
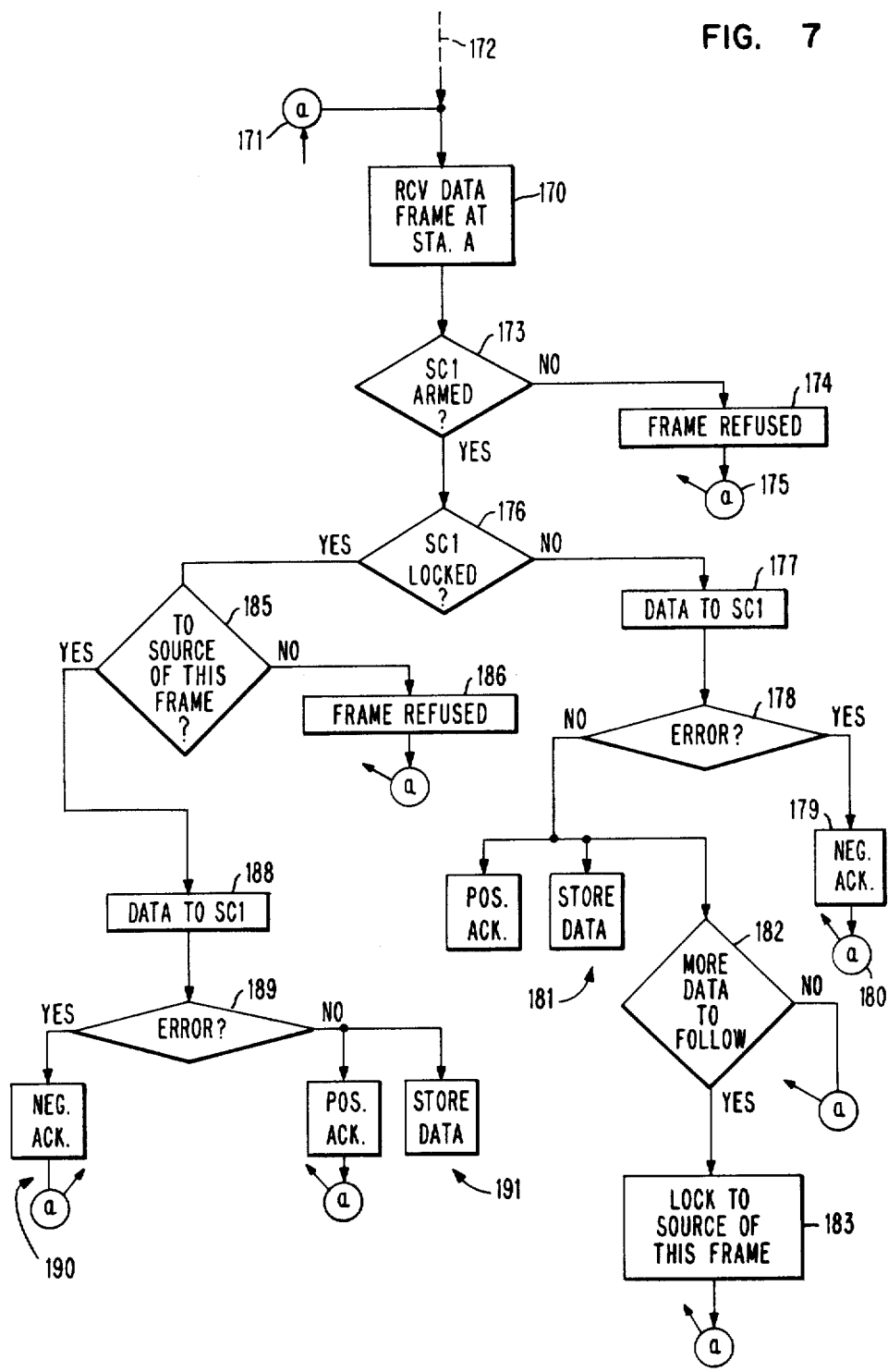

FIG. 7 indicates in a more comprehensive view the process of data reception at station A. This Fig. shows the process for receiving data in a locked mode established either by host system software (in accordance with FIG. 6) or by the ring adapter itself (in response to control information in a first frame of a plural frame data message).

As each data frame having a local destination is received in station A's In Buffer (block 170)—after various stages of ring adapter activity suggested at 171 by the circled connection symbol "a" and at 172 by a simple broken line—selector 118 in the ring adapter (FIG. 3) conditions the handling of that frame on the armed or not armed state of data input subchannel SC1 (decision 173). If SC1 is not armed the frame is rejected and a frame refused response frame is returned to the origin station (block 174). The selector is then prepared (via sequence connections 175-171) for handling a next incoming data frame (block 170) or request frame (not shown), and SC1 may be armed in a not-shown intermediate process.

If SC1 is armed at decision stage 173 the handling of the frame is conditioned on the locked or unlocked state of SC1 (decision 176). If SC1 is currently not locked the data is passed to SC1 as shown at 177. If an error is detected (decision 178) a negative acknowledgment response frame is returned to the sender (block 179) and the selector becomes available (180/171) for handling another frame.

As indicated at 181, if the data is received by SC1 without error a positive acknowledgment response frame is returned and the frame data is stored (in the space prepared for SC1 in host storage). In this circumstance, selector 118 examines the specifier byte of the data frame and determines (from the state of a bit in that byte) if this is the only data frame currently being sent by its origin station or if other frames will follow (decision 182). If the frame will not be followed by other frames the operation is concluded (SC1 is disarmed and, if necessary, re-armed), and no further action is taken. However, if the frame is to be followed by another data frame the selector and SC1 lock to the origin station (block 183) for exclusively receiving data frames thereafter only from that station. In this operation the selector stores the origin station's identity and sets SC1 to locked state.

Assuming that the "yes" decision had been made at 176 (SC1 armed and locked), the selector would determine (decision 185) if the frame was sent by the station to which A is currently locked (by comparing the frame's origin address to the origin station identity which had been stored previously in the locking process). If the frame source does not match the origin identity the frame is refused (block 186). If the frame source does match the data is passed to SC1 (block 188). If an error is detected in passage (decision 189) a negative acknowledgment response frame is returned (block 190). If the frame data is passed without error it is stored in host storage and a positive acknowledgment response is returned (as shown at 191).

Figure 8:
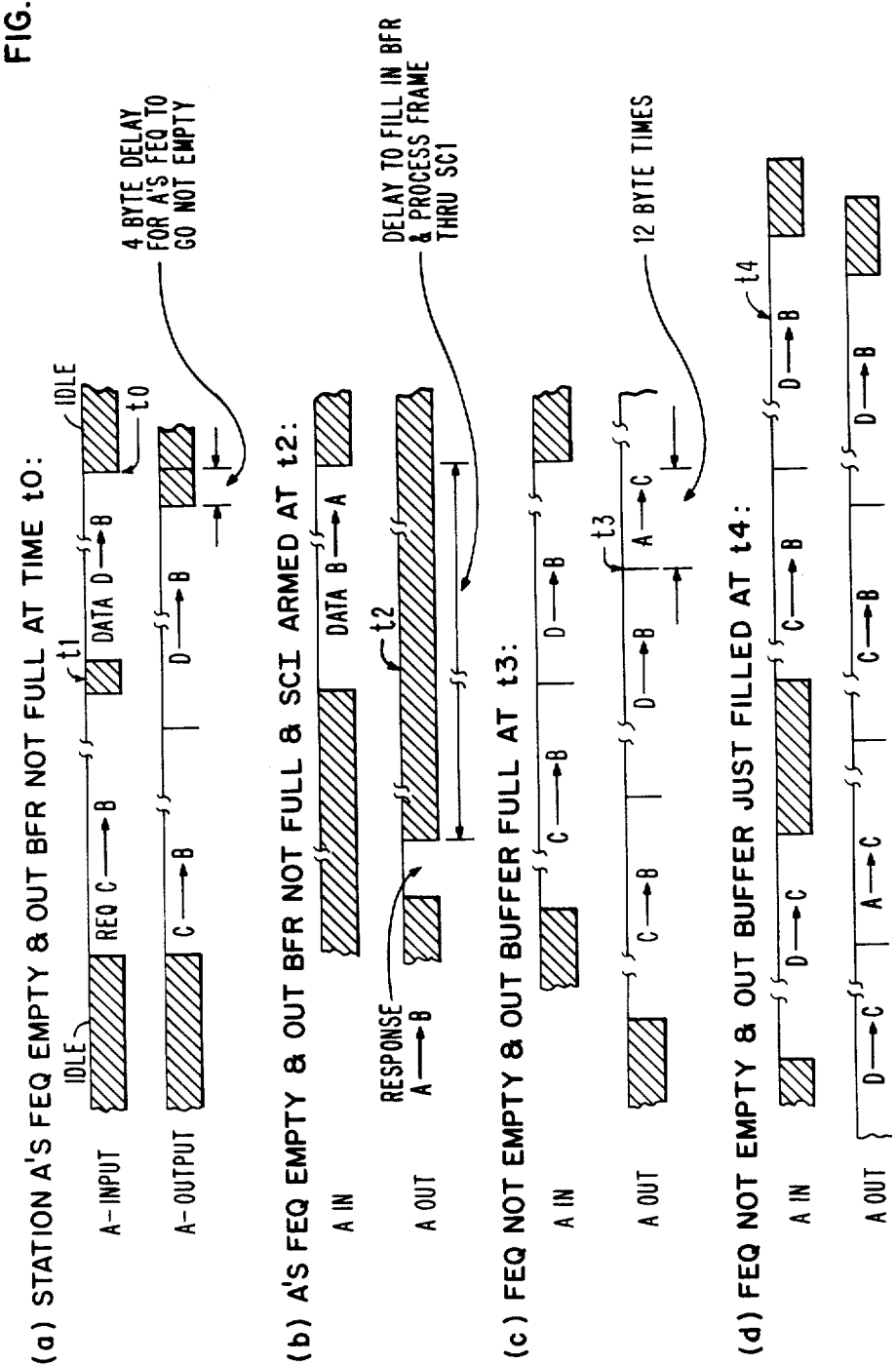
FIG. 8 illustrates the relative timing of signal frames entering and leaving a typical ring station A.
Figure 9:
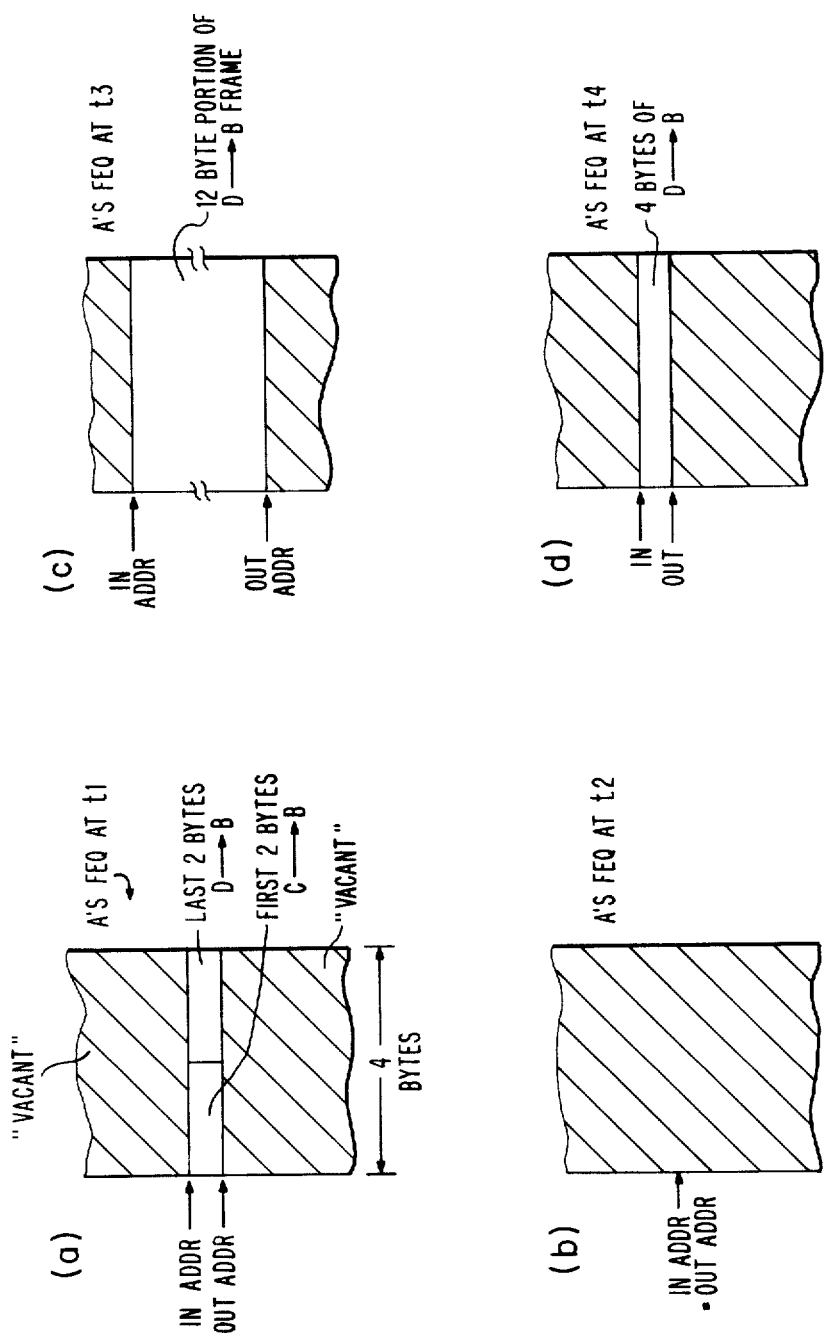
FIG. 9 illustrates the state of occupancy of station A's FEQ buffer at various signal flow stages shown in FIG. 8.

FIG. 8 illustrates the timing of frame signals entering and leaving a typical station (station A) at its ring interface, and FIG. 9 illustrates the condition of that station's FEQ buffer at various times specified in FIG. 8. Parts a–d in FIG. 8 indicate station input/output timing with the station equipment in various initial conditions and parts a–d in FIG. 9 indicate FEQ occupancy conditions at times shown in respective parts of FIG. 8.

At t0 in FIG. 8a the station is about to receive a data frame originating at station D and destined for station B, followed in time by several idle characters, then a request frame in transit from station C to station B, and then more idle characters. Since the station is not sending any locally originated information traffic at t0 (Out Buffer not full) and since the FEQ becomes not empty shortly after t0 (i.e. as soon as four bytes of the incoming frame have been received) the station will begin to transmit the "D to B" data frame after a four byte time delay relative to t0 (assuming that the Out Buffer remains not full while the first four bytes are being received). The station will then continue, without interruption and without sending any idle characters, to send the "D to B" and "C to B" frames contiguously in time. At time t1, when the station is about to send the last two bytes of the "D to B" frame, its FEQ contains the last two bytes of the "D to B" frame and the first two bytes of the "C to B" frame will be entered with the contiguous FIFO positions (see FIG. 9a, and recall that the idle characters separating these frames at the station input are used only for reception synchronization and are not stored in the FEQ).

At time t2 in FIG. 8b it is assumed that station A has received a data frame directed to A from station B. To simplify the illustration, it is also assumed that the frame was preceded and followed at the receiver input by idle characters. As shown on the output line of this part of FIG. 8 the station begins to send a corresponding response frame to station B after an indefinite delay (relative to t2) associated with the station's internal process for loading its In Buffer and passing its data contents SC1 (assumed to be armed). The response frame could be a positive or negative acknowledgment (no error or error) or a frame refusal (if A is locked to a station other than B). As shown in FIG. 9b, at t2 the FEQ is in an empty condition (In Count = Out Count).

At time t3 in FIG. 8c it is assumed that station A has just finished transmitting a local origin message frame to station C (from its Out Buffer) and has received the first twelve bytes of a frame being sent from station D to station B. As shown in FIG. 9c, A's FEQ contains the first twelve bytes of the "D to B" frame at time t3. As indicated on the output line part of FIG. 8c station A will begin to send the D to B frame immediately after sending the last byte of its A to C frame, and then begin to send a C to B frame (which follows the D to B frame on A's input) as soon as it finishes sending the last byte of the D to B frame.

Finally, FIGS. 8d and 9d indicate the handling of a local origin A to C transmission when A's Out Buffer becomes full while the station is sending a D to B "through-traffic" frame partially contained in its FEQ. At time t4 A's FEQ contains four bytes of the D to B frame (see FIG. 9d) which A is then transmitting. It is also assumed that A's Out Buffer becomes full at or after t4 (with the information to be sent from A to C), and that the incoming ring traffic arriving at A after the D to B frame consists of a C to B frame followed by a number of idle characters and then a D to C frame. Since the idle characters are being received when A completes its transmission of the C to B frame, A will immediately begin to send its (local origin) A to C frame after sending the last character of the C to B frame, and then contiguously send the D to C frame after that frame has been partially delayed in A's FEQ.

While there has been described what is at present considered to be a preferred embodiment of this invention, it will be obvious to those skilled in the art that various changes and modifications may be made therein without departing from the invention. It is, therefore, intended to cover all such changes and modifications in the following claims as falling within the true spirit and scope of the invention.

What is claimed is:

1. In a data communication network in which plural data processing systems are serially interconnected in a closed ring, each system having a memory, processing logic, at least one device attachment port and at least one input/output channel for transferring information between respective ports and memory, at least one of said ports being linked to communication media forming said closed ring, each said channel being controllable by the respective system to form a plurality of coactive subchannels between a plurality of discrete memory storage areas and ports in the respective system, a method of operating any one of said systems to communicate with other said systems through its subchannels and said ring comprising:

reserving at least three subchannels in said one system exclusively for transferring information between its memory and other said systems via said ring;

operating said one system to carry out communication with another said system, in a full duplex mode, by transferring information bidirectionally between its memory and the other system via two of said three reserved subchannels and said ring; and operating said system, while conducting said full duplex communication, to be receptive to messages from any of said other systems requiring urgent attention, and to transfer such messages into its memory via remaining one of said three reserved subchannels.

2. In a data communication network in which plural data processing systems are serially interconnected in a closed ring, each system having a memory, processing logic, at least one device attachment port and at least one input/output channel for transferring information between the respective ports and the respective memory, at least one of said ports being linked to communication media forming said ring, each said input/output channel being controllable by programmed commands executed in said system to form a plurality of co-active input and output subchannels between respective memory spaces defined by said commands and respective said ports, a method of operating any one of said systems to carry out communication in a full duplex mode with any other said system while remaining receptive to messages from the other systems requiring urgent attention comprising:

reserving at least two input subchannels and at least one output subchannel in said one system exclusively for carrying out communications with other said systems via said network;

operating said one system to carry out said full duplex communication with another said system by transferring information bidirectionally between said one system's memory and the other system via one of said input subchannels, one of said output subchannels and said ring; and operating said one system, while engaged in said full duplex communication, to be receptive to messages from said other systems requiring urgent attention, by recognizing arrival of such messages at the one system's interface to said ring and transferring said messages into said one system's memory via another one of said reserved input subchannels.

3. The method according to claim 2 comprising:
reserving said one input subchannel in said one system exclusively for reception of information in said full duplex communication, while said one system is engaged in said full duplex communication; and
reserving said one input subchannel for reception of any information when said one system is not engaged in full duplex communication.

4. The method according to claim 2 comprising:
carrying out said full duplex communication by transferring outbound information to said ring in a series of discrete frames variably spaced from each other in time, and by receiving inbound information from said ring in a series of discrete frames variably spaced in time;
transferring each of said inbound frames into said one system's memory exclusively via said one input subchannel while preventing any other inbound communications from passing through said one input subchannel; and
transferring said outbound frames through said one output subchannel while allowing said outbound subchannel to be used for other outbound communications.

5. The method according to claim 2 comprising:
prior to beginning said full duplex communication operating said one system to receive information from any other system via any of said input subchannels;
exchanging control communications with another system indicating that a duplex connection is required;
in response to said control communications, reserving said one input subchannel exclusively for reception of information from said another system; and then
sending a control communication to said another system indicating that said one system is ready to receive information in said duplex mode.

6. The method according to claim 4 comprising:
prior to beginning said full duplex communication, operating said one system to receive information from any other system via any of its input subchannels;
receiving a first information frame in said one input subchannel from another system, said first frame containing control information indicating that other frames will be sent by said another system; and
in response to said control information, reserving said one input subchannel exclusively for receiving frames sent by said another system.

7. The method according to claim 4, wherein said frames have varying bit lengths, comprising:
operating each of said systems to insert idle characters in its outbound transmissions, when its outbound transmissions are shorter in length than its inbound communications, for allowing downstream stations to maintain reception synchronism.

8. The method according to claim 7 comprising:
operating each of said systems to variably delay its inbound communications, to remove all idle characters from such communications, to remove any information frames from such communications which designate the respective station as either a source or destination, and to pass the remainder of such delayed communications downstream along said ring.

* * * * *